3,150,067
PURIFICATION OF CAPROLACTAM
Helmut Stahl, Ludwigshafen (Rhine), Germany, and Georg Eugen Wiest, deceased, late of Ludwigshafen (Rhine), Germany, by Gertrud Wiest, heir and legal representative, Aalen, Germany, assignors to Badische Anilin- & Soda-Fabrik Aktiengesellschaft, Ludwigshafen (Rhine), Germany
No Drawing. Filed Feb. 24, 1960, Ser. No. 12,490
Claims priority, application Germany Feb. 28, 1959
7 Claims. (Cl. 204—158)

This invention relates to a process for the purification of caprolactam. More specifically, the invention relates to a process of purifying caprolactam by a physical treatment.

It is know that the lactams used for the production of polyamides must be very pure because otherwise the polyamides exhibit unsatisfactory properties and in particular readily become yellow. The most common method for the purification of lactams is distillation under reduced pressure, possibly with an addition of acids or alkalies. Certain impurities cannot be separated however even by repeated distillation so that the purity of the lactams does not satisfy high requirements.

According to another know method, the impurities are extracted from the crude lactam solutions with organic solvents, such as benzene or chloroform. This method has the disadvantage that for an effective purification it is necessary to process large amounts of solvents of which the recovery is troublesome and attended by losses. Moreover emulsions are often formed which are difficult to break up.

It is also known that the impurities in lactams can be converted by the action of oxidizing or reducing agents, such as potassium permanganate, potassium chromate, hydrogen peroxide, ozone and nascent hydrogen or molecular hydrogen in the presence of a catalyst, into substances which are separable by distillation. In this way, however, not only the impurities but also the lactams themselves are readily attacked. There are then obtained yellow products with low permanganate numbers which cannot be appreciably improved by distillation. A further disadvantage of this method is that relatively expensive chemical reagents are required.

The caprolactam oils which are obtained by treatment of the sulfuric acid rearrangement mixture of cyclohexanone oxime with water or ammonium sulfate solution and neutralization of the sulfuric acid with ammonia may also be treated with inert gases, such as nitrogen and especially air in fine dispersion, at elevated temperature. In this method, at least when using air, impurities which are contained in the lactam oil are oxidized. This treatment is followed by an extraction with the said disadvantages and a distillation. There is finally obtained a lactam of relatively high purity which however is still not sufficient in many cases.

According to another known method, the purification of caprolactam is carried out by treating it at elevated temperature in the melt with an inert gas, such as nitrogen, hydrogen or air. The lactam is obviously attacked, however, since the yields of pure product are only moderate.

Finally it is also known that lactams can be purified by recrystallization from water. The yields of pure lactams are however unsatisfactory.

It is an object of the present invention to provide a process for the purification of caprolactam by which lactams of high purity are obtained. Another object of the invention is to provide a process by which a pure lactam is obtained in high yields. A further object of the invention is to provide a process for the purification of caprolactam in which expensive chemical reagents are not required. Still another object of the invention is to provide a process for the purification of caprolactam in which a troublesome extraction is not necessary.

According to the present inventoin the said objects are achieved by treating caprolactam in solution, preferably in high-percentage aqueous solution, with ultra-violet radiation or rays of shorter wavelength, removing the solvent and distilling the residue under reduced pressure, advantageously in the presence of alkalies.

The initial material used is preliminarily purified caprolactam, for example that which has been obtained by treatment of the sulfuric acid rearrangement mixture with ammonium sulfate solution, neutralization of the sulfuric acid, separation of the lactam oil and distillation of the same under reduced pressure.

The process is advantageously carried out in concentrated, e.g., 60 to 90% aqueous solution. It is preferable to add only just sufficient solvent to form a clear solution. Such a solution is then of 82% strength at room temperature. It is also possible to use aqueous solutions of lower concentration, as for example 20 to 60% strength, but the cost of distillation is then higher.

Purification may be carried out with ultraviolet rays or with rays of shorter wavelength, such as X-rays and gamma-rays; for reasons of economy the use of ultraviolet rays is preferred. Ultraviolet rays with wavelengths between 2000 and 3800 A. are especially active. Suitable sources of rays include xenon or krypton high pressure lamps, hydrogen lamps, carbon rod electric arc lamps, fluorescent tubes (filled with neon and traces of mercury) and especially mercury vapor lamps. The ray source preferably has ultraviolet-permeable walls, for example of uviol glass, phosphate glass or quartz.

The necessary irradiation periods depend on the degree of purity of the lactam and also on the concentration of the solution and the thickness of the layer thereof. They may readily be ascertained by experiment.

The purification is preferably carried out at room temperature or at the moderately elevated temperatures such as result by reason of the heat radiation from the ray source. By moderately elevated temperatures we understand temperatures between about 20° and 80° C. Obviously it is also possible to carry out the irradiation at lower temperatures. A good purification action is also obtained at higher temperatures, as for examples 80° to 110° C. In this way the removal of the impurities may be combined with the working up of the aqueous solutions by irradiating the mixture and at the same time distilling off the water. A measure of the purity of a lactam is the "permanganate number." This is the number of seconds which elapse until 100 ml. of a 1% lactam solution to which 1 ml. of an N/100 potassium permanganate solution has been added has acquired the same as 100 ml. of a comparison solution which contains 3 grams of cobalt (II) chloride hexahydrate and 2 grams of copper (II) sulfate pentahydrate in 1 liter of solution.

Purification according to this invention my be carried out discontinuously or continuously. In the former case, the lactam solution is placed in a reactor which advantageously contains stirring means. A mercury immersion lamp may be used as ray source. When carrying out the purification continuously, the caprolactam solution is led past a source of rays. The water is removed from the irradiated solution under reduced pressure, as a rule at 10 to 14 mm. Hg. The caprolactam is then distilled over, advantageously in the presence of alkali. Suitable alkalies are alkali hydroxides and carbonates e.g. sodium hydroxide as a caustic soda solution. They may be used as concentrated, e.g., 30 to 60% aqueous solutions.

3

The caprolactam thus purified no longer becomes yellow when stored in the light and with access of air, and is eminently suitable for the production of polyamides. The yield of pure caprolactam is very good. It is practically only the unavoidable loss during the distillation that has to be reckoned with.

The following examples will further illustrate this invention but the invention is not restricted to these examples. The parts are parts by weight.

*Example 1*

200 parts of caprolactam with a permanganate number of 380 are dissolved in 50 parts of water and irradiated for 1 hour with a 350 watt immersion lamp (mercury vapor lamp) in a stirring vessel. The spectrum of this lamp exhibits emission maxima at 3650 A. and 3130 A. and secondary maxima for example at 3020 A. and 2540 A.

The water is withdrawn at reduced pressure from the yellow solution and the lactam is distilled without fractionation at 139° C. at 12 mm. Hg. The yield is 198 parts, i.e., 99% of the theory. The completety colorless condensate has a permanganate number of 1500.

If 0.5% by weight of 50% caustic soda solution is added prior to the distillation, the permanganate number of the distilled lactam is 2600.

*Example 2*

200 parts of caprolactam with the permanganate number 300, dissolved in 50 parts of water, are irradiated in the way described in Example 1 for 2 hours with a xenon high pressure lamp. The lamp emits a radiation which lies for the most part in the wavelength range between 2200 and 3700 A. After irradiation, the solution is distilled. A lactam with the permanganate number 1300 is obtained in a 97% yield.

What is claimed is:

1. A process for the purification of caprolactam which comprises irradiating caprolactam in an aqueous solution with radiation from an artificial source predominately emitting radiation with a wave length falling in the range of from ultraviolet rays to gamma-rays, inclusive, removing the solvent and distilling the residue under reduced pressure.

2. A process as claimed in claim 1 which comprises irradiating said caprolactam in an aqueous solution at a temperature of about room temperature up to about 100° C.

3. A process as claimed in claim 2 which comprises irradiating said caprolactam in aqueous solution at a temperature of about 20° C to 80° C.

4. A process as claimed in claim 1 which comprises irradiating said caprolactam with ultraviolet rays of a wavelength of 2000 to 3800 A.

5. A process as claimed in claim 1 which comprises distilling said residue in the presence of alkalies.

6. A process as claimed in claim 5 which comprises irradiating a 60 to 90% aqueous solution of caprolactam.

7. A process as claimed in claim 1 wherein the distillation of the residue is carried out in the presence of sodium hydroxide.

References Cited in the file of this patent

UNITED STATES PATENTS

| | | |
|---|---|---|
| 2,785,118 | Roecker | Mar. 12, 1957 |
| 2,813,858 | Joris | Nov. 19, 1957 |
| 2,856,338 | Grosser | Oct. 14, 1958 |
| 2,982,762 | Voeks et al. | May 2, 1961 |
| 2,988,546 | Lippincott et al. | June 13, 1961 |

FOREIGN PATENTS

| | | |
|---|---|---|
| 723,594 | Great Britain | Feb. 9, 1955 |

OTHER REFERENCES

Progress Report on Fission Products Utilization, VII, BNL-317.

UNITED STATES PATENT OFFICE
CERTIFICATE OF CORRECTION

Patent No. 3,150,067                          September 22, 1964

Helmut Stahl et al.

It is hereby certified that error appears in the above numbered patent requiring correction and that the said Letters Patent should read as corrected below.

Column 2, line 54, for "the same as 100 ml." read -- the same color as 100 ml. --; column 4, line 10, for "100° C." read -- 110° C. --.

Signed and sealed this 19th day of January 1965.

(SEAL)
Attest:

ERNEST W. SWIDER                          EDWARD J. BRENNER
Attesting Officer                            Commissioner of Patents